Patented July 19, 1949

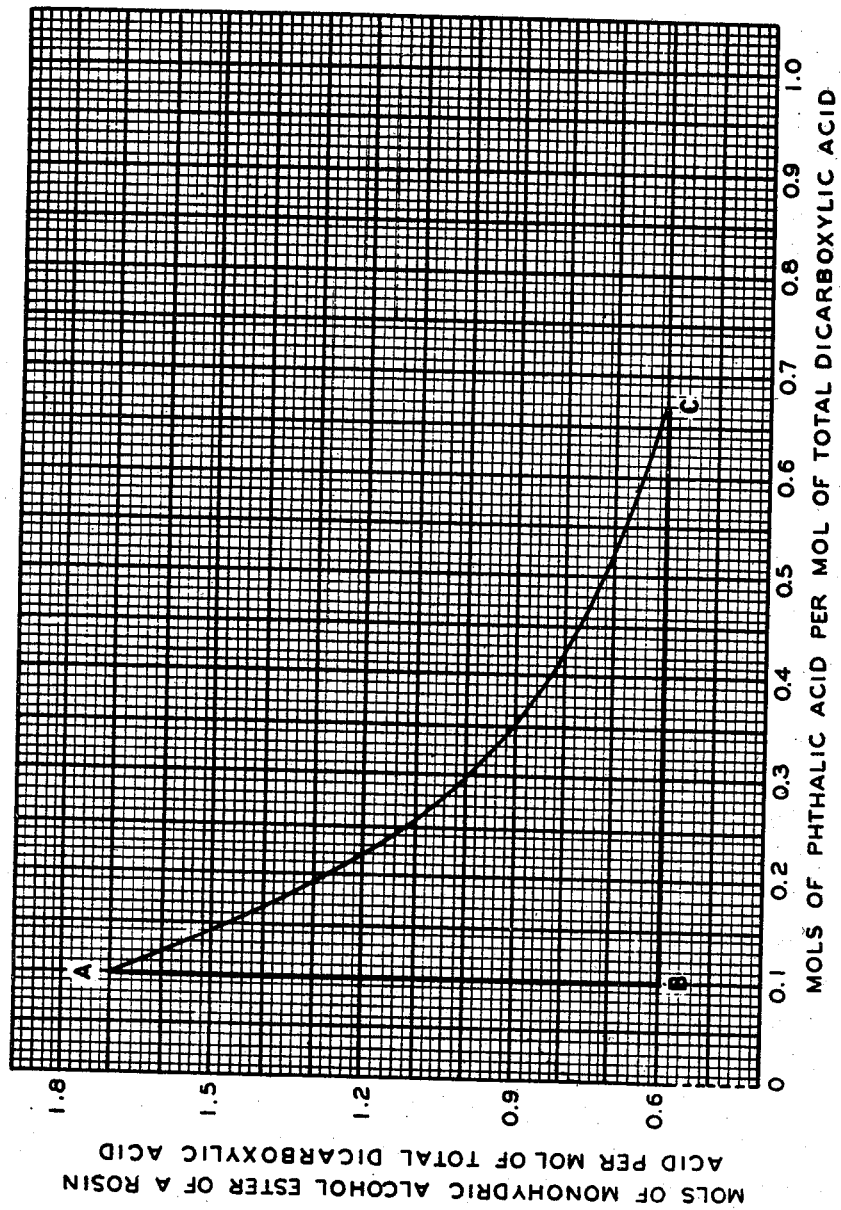
FIG. I
CLARENCE D. ENDER
INVENTOR.

2,476,714

UNITED STATES PATENT OFFICE 2,476,714

ROSIN ESTER-MODIFIED ALKYD RESIN

Clarence D. Ender, Wilmington, Del., assignor to Hercules Powder Company, Wilmington, Del., a corporation of Delaware Application December 5, 1946, Serial No. 714,186

9 Claims. (Cl. 260—26)

This invention relates to synthetic resins and to methods for the preparation thereof. More particularly, it relates to reaction products of dihydric alcohols, alpha-beta-unsaturated dicarboxylic acids, phthalic acid, and monohydric alcohol esters of a rosin acid and to methods for their preparation.

In U. S. patent application S. N. 490,645, filed June 12, 1943 now Patent No. 2,411,904, there are described resins prepared from a dihydric alcohol, an alpha-beta-unsaturated dicarboxylic acid and a monohydric alcohol ester of a rosin acid, these resins being characterized by fusibility, by solubility in benzene and ethyl acetate and by a phenol red acid number less than 50. These resins have the unique characteristics of substantial stability to heat at temperatures below 150° C. and at the same time the capacity to be cured to an infusible state by heat at above 200° C. This characteristic is obviously an important one and one which suggests many applications in the commercial arts, such as hot-melt coating, etc.

An important disadvantage, however, attends the use of these resins in conjunction with vinyl resins, particularly the vinyl acetate-chloride copolymer. Compatible films containing the resin and copolymer can be obtained by dispersing the ingredients in the usual solvents for the copolymer and laying the films down immediately. The dispersions, however, even when freshly prepared are cloudy. They become more cloudy with age and the ingredients finally settle out. Unless the dispersions are used immediately after preparation, the resulting films are of a heterogeneous nature and clearly evidence incompatibility of the ingredients. These resins may, accordingly, be said to lack solution compatibility with vinyl acetate-chloride copolymers. This characteristic is not limited to a particular solvent system but is common to all the solvents generally employed with this copolymer. The characteristic is obviously a very detrimental one in the manufacture of lacquers intended for shelf goods and in industrial applications where the dispersions cannot be used immediately after preparation.

In accordance with this invention, it has now been found possible to overcome this disadvantage by employing in the preparation of the resin a portion of phthalic acid in replacement for part of the alpha-beta unsaturated dicarboxylic acid. The amount of phthalic acid employed is critical and may be varied from about 0.10 to about 0.67 mol per mol of total dicarboxylic acid, depending upon the amount of monohydric alcohol ester of rosin acid employed as shown in Figure 1. Resins prepared on the basis of these critical amounts of phthalic acid have the capacity to form permanently clear solutions with vinyl acetate-chloride copolymer resins in the usual solvents for such copolymer resins. They are also characterized by having substantially lower viscosities in the molten state as compared with resins of S. N. 490,645. At the same time, the resins retain the unique thermosetting properties of the resins described in application S. N. 490,645, i. e., they have substantial stability to heat at temperatures below 150° C. but have the capacity to be cured to an infusible state at temperatures above 200° C. and have a cure time (defined infra) at 200° C. of less than 4 minutes.

The resinous reaction products of this invention are accordingly prepared from a dihydric alcohol, an alpha-beta-unsaturated dicarboxylic acid, phthalic acid and a monohydric alcohol ester of a rosin acid. The dihydric alcohol is employed in the amount of from 0.70 to 1.50 mols per mol of total dicarboxylic acid. The nonalcoholic reactants are employed in amounts as defined by the area ABC of Figure 1.

The examples following illustrate typical procedures in accordance with the invention:

Example 1

A resin was prepared on the basis of the following raw material formulation:

| | Parts |
|---|---|
| (A) Phthalic anhydride | 10.9 |
| (B) Maleic anhydride | 21.5 |
| (C) Ethylene glycol | 22.0 |
| (D) Methyl ester of rosin | 92.2 |

Reactants A, B and C were charged into a reaction kettle and heated at 200–210° C. for a period of about 2 hours until the acid number of the mixture was 65. Reactant D was then added and the temperature raised to 260–265° C. The reaction was continued at this temperature for a period of about 6 hours, during the last 4 hours of which a vacuum sparge was employed. The resulting resin had the following properties:

| | |
|---|---|
| Acid number | 0.9 |
| Drop melting point | °C 83 |
| Curing time | seconds 73 |
| Color | 80 amber+65 red |

This resin was characterized by the capacity to form permanently clear solutions with vinyl acetate-chloride copolymers, for example, vinyl acetate-chloride copolymer (Vinylite VYLF) and the resin of this example in all proportions formed permanently clear solutions in cyclohexanone (15–25% solids). Films laid down from this solution showed the ingredients to be entirely compatible. The resin of this example could be heated at temperatures below 150° C. for extended periods of time without any substantial build up in viscosity. Upon heating the resin in film form at temperatures above 200° C., however, the resin cured to an infusible state.

Example 2

A resin was prepared on the basis of the following raw material formulation:

| | Parts |
|---|---|
| (A) Phthalic anhydride | 74 |
| (B) Maleic anhydride | 196 |
| (C) Ethylene glycol | 188 |
| (D) Methyl ester of rosin | 789 |

Reactants A, B, and C were reacted for a period of about 2 hours at a temperature within the range of 193–206° C. to produce a product having an acid number of 60. At this point, 789 parts of reactant D were added and the reaction continued at a temperature of 251–263° C. for a period of about 4 hours, during the last hour of which the reaction mass was sparged with carbon dioxide. This product had the following properties:

| | |
|---|---|
| Acid number | 4.9 |
| Curing time _____seconds | 44 |

This resin formed permanently clear solutions with vinyl acetate-chloride copolymers, was stable to heat at temperatures below 150° C. and had curing characteristics similar to the Example 1 resin at temperatures above 200° C.

Example 3

A resin was prepared on the basis of the following raw material formulation:

| | Parts |
|---|---|
| (A) Phthalic anhydride | 3.3 |
| (B) Maleic anhydride | 19.6 |
| (C) Ethylene glycol | 16.5 |
| (D) Methyl ester of rosin | 105.2 |

Reactants A, B and C were charged into a reaction kettle and heated at 195–210° C. for about 1.5 hours until the acid number was 40. Reactant D was then added and the temperature raised to 260–270° C. The reaction was continued at this temperature for 5.5 hours, using a nitrogen gas sparge during the last 4 hours. The resulting resin had the following properties:

| | |
|---|---|
| Acid number | 2.8 |
| Drop melting point _____°C | 62.5 |
| Curing time _____seconds | 115 |

This resin had the compatibility and heat stability characteristics of the resin of Example 1. Films of the resin could be cured by heating at temperatures above 200° C. The resin possessed excellent gasoline resistance.

Example 4

A resin was prepared on the basis of the following raw material formulation:

| | Parts |
|---|---|
| (A) Phthalic anhydride | 19.7 |
| (B) Maleic anhydride | 11.5 |
| (C) Ethylene glycol | 19.4 |
| (D) Methyl ester of rosin | 49.5 |

Ingredients A, B, and C were heated at 195–210° C. for 1.8 hours to obtain a product having an acid number of 59. Ingredient D was added and the mixture heated at 260–270° C. for 3.5 hours. The reaction mixture was sparged with nitrogen during the last 2 hours. The resulting resin had the following properties:

| | |
|---|---|
| Acid number | 2.2 |
| Drop melting point _____°C | 73 |
| Curing time _____seconds | 40 |

This resin formed permanently clear solutions with vinyl acetate-chloride copolymers and was stable to heat at temperatures below 150° C. It had curing characteristics similar to the resin of Example 1 at temperatures above 200° C.

Example 5

A resin was prepared on the basis of the following raw material formulation:

| | Parts |
|---|---|
| (A) Phthalic anhydride | 5.9 |
| (B) Maleic anhydride | 10.6 |
| (C) Ethylene glycol | 10.6 |
| (D) Methyl ester of rosin | 50.1 |

All ingredients were heated up to a maximum temperature of 260–270° C. over a period of 3 hours at which point a resin having an acid number of 16 was obtained. Heating was continued at 260–270° C. until a cure time of the resin was 125 seconds. The final resins had these properties:

| | |
|---|---|
| Acid number | 7.8 |
| Drop melting point _____°C | 77 |
| Curing time _____seconds | 125 |

The compatibility and heat stability characteristics of this resin were substantially the same as those of the resin of Example 1.

Example 6

A resin was prepared on the basis of the following raw material formulation:

| | Parts |
|---|---|
| (A) Phthalic anhydride | 3.0 |
| (B) Fumaric acid | 20.0 |
| (C) Diethylene glycol | 25.3 |
| (D) Methyl ester of rosin | 62.3 |

Reactants A, B and C were heated at 195–210° C. for 1.2 hours at which point the product had an acid number of 45. Reactant D was added and heating continued at 260–270° C. for 1.5 hours. The final product had the following properties:

| | |
|---|---|
| Acid number | 1.1 |
| Drop melting point _____°C | 54 |
| Curing time _____seconds | 24 |

This resin was compatible with vinyl acetate-chloride copolymers (Vinylite VYHH) in the ratios of 1:3, 1:1 and 3:1. Permanently clear solutions were obtained from the ingredients in these proportions in the usual solvents for vinyl acetate-chloride copolymer resins, as for example cyclohexanone. The resin per se was stable to heat at temperatures below 150° C., but could be cured by heating films thereof at temperatures above 200° C.

Example 7

A clear lacquer was prepared on the basis of the following formulation. A 25% solids solution of Vinylite VYHH in a solvent composed of equal parts of toluene and acetone was prepared. Vinylite VYHH is a vinyl acetate-chloride copolymer comprising 85–88% vinyl chloride and having an average molecular weight of 10,000. A 75% solids solution of the resin of Example 2 in toluene was then prepared. To 280 parts of the Vinylite solution were added 20 parts of the resin solution and 15 parts of tricresylphosphate. The resulting lacquer was perfectly clear and showed no evidence of solution incompatibility on aging. Films prepared from this lacquer after aging for 6 months showed no evidence of incompatibility of the ingredients. The films were quite flexible and free from tack. Paper coated with the lacquer exhibited no blocking tendency.

The examples illustrate the use of maleic anhydride in the preparation of the product according to this invention. However, any alpha-beta-unsaturated dicarboxylic acid or the anhydride of such acid may be substituted. Thus, maleic acid, maleic anhydride, fumaric acid, itaconic acid and the like are suitable. The anhydrides of the alpha,beta-unsaturated dicarboxylic acids and the acids themselves are equivalently operable in this invention.

The dihydric alcohol utilized in the method of this invention may be in general any dihydric alcohol which, aside from the hydroxy groups, contains no other groups which are reactive under the conditions of resin preparation herein described. The aliphatic glycols may accordingly be employed. Preferably the alkylene glycols and polyalkylene glycols are employed. For example, alkylene glycols such as ethylene glycol, propylene glycol, (1,2-dihydroxybutane), (1,3-dihydroxybutane), (1,4-dihydroxybutane), (2,3-dihydroxybutane), the amylene glycols, etc., may be employed. Examples of the polyalkylene glycols which may be used are diethylene glycol, triethylene glycol, tetraethylene glycol, hexaethylene glycol, nonaethylene glycol, trimethylene glycol, dipropylene glycol, etc.

In preparing any of the subject synthetic resins, any monohydric alcohol ester of a rosin acid may be employed. The methyl ester is most readily available and is in general preferred. However, other monohydric alcohol esters such as the esters prepared from ethyl alcohol, propyl alcohol, isopropyl alcohol, butyl alcohol, isobutyl alcohol, amyl alcohol, isoamyl alcohol, capryl alcohol, lauryl alcohol, benzyl alcohol, and chloroethyl alcohol have been found suitable in the process.

The rosin acid constituent of the ester employed may be gum rosin, wood rosin, substantially pure rosin acids obtained from said rosins, specific rosin acids as abietic acid, d-pimaric acid, l-pimaric acid, sapinic acid, etc., various natural or synthetic mixtures of said specific rosin acids. Furthermore, the rosin acid constituent may be a partially hydrogenated rosin acid. Any rosin acid wherein from 0 to about 70% of the total number of double bonds originally present (two per rosin acid molecule) have been saturated with hydrogen can be employed. Practically, the degree of saturation of a rosin acid may be evaluated by determining its thiocyanogen value. On this basis any rosin acid may be employed in accordance with this invention which has a thiocyanogen value between 25 and 80. Synthetic resins prepared from such partially hydrogenated rosin acids are the substantial equivalents of resins prepared from unhydrogenated rosin acids. Completely hydrogenated rosin acids cannot, however, be employed; and resins derived from rosin acid esters wherein substantially more than 70% of the total number of double bonds of the rosin acid component are saturated with hydrogen do not possess the unique properties described hereinbefore for the resins of the invention. Some ethylenic unsaturation must remain in the rosin acid ester employed.

The quantity of the dihydric alcohol used in accordance with this invention will be from about 0.70 mol to about 1.50 mols of the dihydric alcohol for each mol of total dicarboxylic acid. Quantities below 1 mol of the dihydric alcohol lead to ultimate products of relatively high acid number and are used only when high acid number resins, which are of value in the preparation of aqueous dispersions or salts, are desired. For most purposes, between 1 mol and 1.30 mols of dihydric alcohol are used for each mol of total dicarboxylic acid. A slight excess of the alcohol is desirable to obtain an ultimate product low in acid number.

The amount of phthalic acid (or the anhydride thereof) utilized is critical and should be from about 0.10 to about 0.67 mol per mol of total dicarboxylic acid, and the amount which may be used varies with the mol ratio of rosin ester to total dicarboxylic acid as can be seen from Figure 1. If too little phthalic acid is employed, the resulting resin does not possess the desirable characteristic of forming permanently clear solutions with vinyl acetate-chloride copolymers. On the other hand, if the amount of phthalic acid used is too high, the resulting resin does not possess the unique characteristic of stability to heat at temperatures below 150° C. and the capacity to be cured to an infusible state by heating at above 200° C. In other words, such a resin is essentially thermoplastic in nature.

Similarly the amount of monohydric alcohol ester of a rosin acid must be critically controlled to obtain resins having the unique characteristic described for the resins of this invention. To achieve these characteristics, the monohydric alcohol ester may be employed in the amount of from 0.60 to 1.70 mols per mol of total dicarboxylic acid as shown on Figure 1.

There are two distinct methods for obtaining the resins of this invention. Both have been illustrated in the examples. One method involves a stepwise reaction in contrast to the other in which all ingredients are reacted simultaneously. The following statements refer particularly to the stepwise procedure of reaction which is regarded as preferable due to the ease of control which it permits.

In the first stage, the dihydric alcohol, the alpha-beta-unsaturated dicarboxylic acid and the phthalic acid are heated together at a temperature between about 100° C. and about 250° C., preferably at a temperature between about 160° C. and about 210° C., until the acid number of the mixture has dropped to a value below about 150 and above about 30 by the phenol-red method. Preferably, the mixture is brought to an acid number between 50 and 100. The phenol-red method of determining acid numbers is utilized for control since the determination is reproduceable whereas other acid number methods such as titration with a phenolphthalein indicator give varying results from test to test because of a fading or shifting end points. The time required for this reaction stage varies from about 0.25 to about 10 hours, depending upon the temperature used and the size of the reaction mass. Where higher temperatures in the range are used and the mass is capable of being rapidly heated, the time required for the reaction is relatively short.

When the first stage has been completed, the monohydric alcohol ester of a rosin acid is added to the mixture. If desired, this ester may be preheated, for example, to 100–250° C. in order to speed the reaction. The resulting mixture is then heated at a temperature between about 200° C. and about 300° C. preferably between about 230° C. and about 270° C. until the product has reached the desired state.

The second stage reaction is continued by maintaining the reaction temperature until the cure time of the resulting mass is less than four minutes, preferably, between about 40 seconds and about 90 seconds, as measured on the product after cooling. The reaction is readily controlled by making cure time tests as it proceeds and allowing for a drop in cure time during cooling of the material. This drop is readily determined by experience with any given size mass and any given type of container in which the resin is permitted to cool. Usually, the drop in curing time during cooling of the resin will not be in excess of 30 seconds. It will be appreciated that the reaction continues at an appreciable rate after heating has been discontinued only as long as the temperature of the mass remains above about 200° C. The acid number of the resin is decreased during the second stage of reaction to a value of less than about 50 and preferably to a value between about 1 and about 15, the time required for this stage may vary between about 0.25 and about 10 hours and in most cases will be between about 1 and about 6 hours.

An alternative method for making the subject resins is to simply heat the ingredients simultaneously at a temperature of from about 200° C. to about 300° C., preferably between about 230° C. and about 270° C. until the resulting mass has a cure time less than 4 minutes, preferably, between about 40 sec. and about 90 sec., as measured on the product after cooling. When this method is employed, it is highly desirable to control the upheat so that the temperature is gradually raised to the maximum desired over a period of from 2 to 8 hours. Such procedure avoids any premature gelation tendencies. After the maximum temperature is reached, heating is continued for from 1 to 15 hours, normally from 4 to 8 hours to provide a product having the desirable characteristics herein described.

It should be understood that, whereas resins having the unique characteristics described result from the utilization of the processes described hereinabove, resins having these properties cannot be obtained by utilizing the stepwise procedure which involves first reacting the rosin ester with the alpha-beta-unsaturated dicarboxylic acid and phthalic acid and then reacting the resulting product with a dihydric alcohol. When this procedure is employed, the resulting resins do not possess the unique characteristics of stability to heat at temperatures below 150° C. and the capacity to be cured to an insoluble infusible state at temperatures above 200° C. Resins prepared by the last described procedure are essentially thermoplastic and very dark in color and for that reason are useless in many commercial applications.

Irrespective of the method employed to prepare the subject resins, it is usually desirable to sparge the resins during the last hour of the reaction with nitrogen, hydrogen, carbon dioxide or other gas which is inert at the reaction temperature to remove any readily volatile material which may be present. If desired, the reaction vessel may be put under vacuum during the last 2 or 3 hours of the reaction in order to remove a small amount of unreacted monohydric alcohol rosin ester and to increase the hardness of the final resin.

Reaction diluents such as inert petroleum hydrocarbon solvents or other inert solvents may be present if desired. However, they have no advantage other than reducing the power required for agitating the mixture. In many cases, the reaction mixture is cloudy for a time showing the existence of two phases. However, agitation of the mixture in all cases leads to an ultimate single phase product.

The resinous products in accordance with this invention vary from balsams, i. e., highly viscous liquids, to hard resins. The melting point is affected chiefly by the particular dihydric alcohol utilized and the proportion of monohydric alcohol rosin ester employed. The resins prepared from ethylene glycol are generally flexible, moderately hard and substantially nontacky at room temperatures. Resins prepared from diethylene glycol are generally flexible, soft and somewhat tacky at room temperatures. Similar resins prepared from triethylene glycol are generally soft and highly tacky at room temperatures.

The acid number of the product is below about 50 by the phenol-red method and will be below about 25 unless it is desired to utilize the resin for the preparation of salts or aqueous dispersions. Normally, the acid number will be 1 to 15 by the phenol-red method. The cure time will in all cases be less than four minutes and where a resin is in the soluble, fusible state, it will be above zero.

The resins in accordance with this invention are odorless, tasteless and highly resistant to greases and oils. They have high adhesion when applied from solvent solution or from the molten state to cellulosic materials, metals, glass, and synthetic resinous articles. The resins are substantially unreactive and usually are very low in content of double bonds as shown by thiocyanate values in most cases below 50 and usually about 10.

The resins in the uncured state or soluble in benzene, toluene, coal tar naphthas, methyl acetate, ethyl acetate and similar ester solvents, acetone, methyl ethyl ketone and similar ketones. They are substantially insoluble in petroleum (aliphatic) hydrocarbons, in lower aliphatic alcohols, in paraffin base mineral oil, in fats and in wax. They are compatible with nitrocellulose, cellulose acetate propionate, cellulose acetate butyrate and benzyl cellulose over a wide range of proportions and have a limited compatibility with ethyl cellulose. The resins are furthermore compatible with casein, chlorinated rubber, methyl and ethyl methacrylate polymers and melamine resins. Formulation with cellulose derivatives raises the softening point of the resin and decreases tackiness. Although the resins are not soluble in many waxes, small amounts of wax may be added to compositions containing the resins with the effect of increasing the moisture-vaporproofness of films prepared from such compositions.

One of the unique characteristics of the resins of this invention, which makes them very useful commercially, is their compatibility with the vinyl resins generally. The resins are, for example, widely compatible with polyvinyl chloride, polyvinyl formal, polyvinyl butyral and vinyl acetate-chloride copolymers, and possess limited compatibility with polyvinyl acetate. The resins possess at the same time excellent solution compatibility with the vinyl resins, particularly the vinyl acetate-chloride copolymers, and form permanently clear solutions with vinyl acetate-chloride copolymers in the usual solvents for such copolymers. Solutions containing the subject resins and vinyl resins may be employed as lacquers, adhesives, etc. The resulting films give the appearance of greater depth and higher gloss, have better adhesion to wood, paper and metal compared with films deposited from solutions of the vinyl resins per se. Hot-melt compositions containing the subject resins and the above-mentioned compatible film formers may be used as laminating adhesives in heat-sealing applications, and as surface coatings.

An outstanding characteristic of the resins in accordance with this invention is their substantially unlimited stability at elevated temperatures at which they are sufficiently fluid to be readily coated in the molten state, coupled with the property of curing at very high temperatures. These resins, in the molten state, possess a substantially lower viscosity than do the resins of the above-mentioned application S. N. 490,645, which makes them more readily adapted to hot melt coating applications. The resins in all cases are readily coated from the molten state at below 150° C., for example, between about 110° C. and about 145° C. Unlike the usual film-forming alkyd resins, they may be maintained in the fluid state for prolonged periods of time without curing and with substantially no increase in viscosity. For example, they are characterized by a heat stability in excess of 16 hours at below 150° C., i. e., they do not cure upon being heated at below 150° C. for 16 hours. However, upon being heated at 200° C. or to a higher temperature below that of decomposition, they cure to an infusible, insoluble state.

Soluble resins in accordance with this invention may be used for coating, in general, from either solvent solution or from the molten state, the latter being preferable. The resin may be used alone or may be combined with the cellulose derivatives, the vinyl and other resins mentioned hereinabove are compatible therewith. Insoluble metal soaps such as calcium stearate may be added, for example, to the extent of 5 to 15% to eliminate tackiness or tendency to block. The addition of waxes has a similar effect. Coatings of the resin are particularly useful on flexible webs such as paper, regenerated cellulose, cellulose derivative films, felts and woven textiles to which they may be applied by calendering or molten coating. Such webs may also be impregnated with the resin from molten baths or solvent solutions with the effect of sizing and increasing the strength of the web. By using a large excess of impregnating and coating material, impervious sheeting such as varnished cloths may be prepared. For example, cambric passed through a viscous molten mixture comprising 84% of the resin in accordance with Example 1, 10% of methyl hydroabietate, 3% of calcium stearate, and 3% of butyl stearate upon cooling was impervious but flexible. Several layers of this material pressed together at 240° C. became laminated into heavy sheeting which cured to an an infusible, insoluble sheeted mass suitable for gaskets. The resins in accordance with this invention are useful as bases for printing inks, preferably applied in solution in a slowly volatile solvent. The printed matter may be heated at 180-300° C. to cure the resin in the coating if desired.

The present invention includes within its scope articles coated with the resin and particularly flexible webs such as paper and cloth coated therewith. The coatings may be left in the soluble, fusible state or may be cured in situ to the gelled, infusible state. The coated articles include coated laminates and laminated articles held together by adhesive coatings comprising the resins in accordance with this invention.

Thus, wood veneers or sheets may be coated with the resin from molten baths or by calendering and the sheets pressed together with the aid of heat to form a plywood. Continued heating at 200-300° C. renders the resinous binder unaffected by heat and solvents.

The uncured resins of this invention are particularly useful in the formulation of compositions suitable for the manufacture of phonograph records of both the filled and unfilled types. In the manufacture of the unfilled types, any of the film-forming vinyl resins such as polyvinyl chloride, polyvinyl acetate, vinyl acetate-chloride copolymers, polyvinyl formal, polyvinyl butyral, etc. are compounded with from 1 to 30% of the resins of this invention (total weight basis) and the resulting composition molded, usually under heat and pressure. Other film-formers which may be used in place of the vinyl resins are ethyl cellulose, cellulose acetate-propionate, cellulose acetate, butyrate, polyalkyl methacrylates and combinations of these various film-formers. Small amounts of plasticizers such as dioctyl phthalate and/or other modifiers such as natural or synthetic waxes may be added as desired.

To make the filled types, a binder is prepared on the basis of from 1 to 60% of the resins of this invention, from 5 to 99% of a film-former selected from those mentioned in the paragraph immediately preceding, shellac, nitrocellulose, synthetic rubbers such as butadiene-styrene copolymers, butadiene-acrylonitrile copolymers, or combinations of such film-formers, and from 0 to 90% of low cost or diluent resins such as Vinsol (a petroleum hydrocarbon insoluble resin obtained from pine wood stumps), rosin, rosin esters, ethylenic hydrocarbon polymers, polynuclear aromatic hydrocarbon resins obtained as by-products in water gas manufacture (Resinex), coumarone-indene polymers, etc. A moldable composition is then made on the basis of about 15–40% binder and about 60–85% filler such as clay, whiting, slate flour, carbon black, etc.

Not only can the resins of this invention be employed as above indicated, but the resins of application S. N. 490,645 may be similarly employed and in substantially the same proportions. Furthermore, resins prepared from the same ingredients as the resins of this invention but which remain thermoplastic upon being heated to temperatures of 200° C. and above, i. e., those resins whose compositions lie in the area to the right of the line AC of Figure 1, may be successfully used in place of the resins of this invention in making phonograph records.

The following are specific examples of formulations suitable for compounding clear and filled phonograph record compositions:

|  | Clear Type | Filled Type |
| --- | --- | --- |
|  | Parts | Parts |
| Vinyl acetate-chloride copolymer (Vinylite VYHH) | 85.0 | 9.5 |
| Resin of Example 1 | 15.0 | 2.4 |
| Acra Wax C (cetylamide) | 1.0 |  |
| Calcium stearate | 1.5 |  |
| Carnauba wax |  | 1.5 |
| Vinsol |  | 11.8 |
| Filler |  | 73.8 |
| Carbon black |  | 1.0 |
| Zinc stearate |  | 0.3 |

These materials were compounded in accordance with the usual procedure of the art. In molding the resulting compositions under heat and pressure, it was found that they exhibited exceptionally good flow characteristics, in this respect much improved over similar compositions not containing the resin of Example 1. At the same time, the finished records did not show any substantial diminution in flexural strength or wearing properties as compared with records prepared from similar compositions not containing the resin of Example 1.

By suitably adjusting the types and percentages of the ingredients described as useful in making phonograph records, compositions may be obtained which are suitable for the manufacture of floor tiles, hot-melt or solution type adhesives, flexible sheeting, etc. Thus, for example, a composition suitable for the manufacture of floor tiles can be made with the following formulation:

| | Parts |
|---|---|
| Vinyl acetate-chloride copolymer | 19.2 |
| Resin of Example 1 | 8.0 |
| Di-2-ethyl hexyl phthalate | 4.8 |
| Ground limestone | 62.3 |
| Short fibre asbestos | 3.7 |
| Titanium dioxide | 2.0 |

The ingredients may be varied such that the binder (exclusive of pigment or filler) contains from about 5% to about 95% of the subject resins and from about 5% to about 95% of the vinyl resin. The use of the resins of this invention in floor tile compositions promotes the workability and moldability of the compositions without affecting appreciably the strength of the finished tile.

Where in the specification and claims reference is made to the phenol red method for determining acid number, it will be understood that the acid number is determined in accordance with the following procedure: Two to three grams of material are weighed to the nearest 0.001 gram into a 250 milliliter Erlenmeyer flask and dissolved therein in 85 milliliters of acetone, 15 milliliters of ethyl alcohol and six drops of phenol red indicator solution (1% phenol red in alcohol). The acetone-alcohol solution is titrated to a pink endpoint with standardized alcoholic potassium hydroxide solution of a normality factor of approximately 0..6. The acid number is calculated as follows:

$$\text{Acid No.} = \frac{\text{Milliliters KOH Solution} \times \text{N. F.} \times 56.1}{\text{Weight of Sample}}$$

where N. F. is the normality factor of the potassium hydroxide solution.

Where in the specification and claims the expression "cure time" is used, it will be understood to refer to the time required to render a small particle of the resin referred to infusible at 200° C. by the following procedure: A small part or drop of the resin of a size no larger than the head of an ordinary pin is picked up by the point of a sharpened nail. The nail carrying the resin particle is drawn across a polished metal plate maintained at a temperature of 200° C. ± 2° C., making a shiny streak of wet molten resin on the plate best observed by viewing in line with light reflected therefrom. The nail is then wiped clean and repeatedly drawn lengthwise along the wet streak. Initially, the nail has no effect on the streak as the wet resin flows together immediately behind the nail. However, after a time the wet resin sets and does not flow together to maintain the shiny wet streak, i. e., the nail leaves a mark in the previously wet streak. The time required for the wet streak to reach the point at which it sets in this manner, measured from the time the resin is applied to the hot plate, is the cure time. A cure time of in excess of five minutes is indicative of a material which cannot be cured by heat since any material requiring more than five minutes to become gummy under the conditions of the test cures, if at all, by oxidation rather than by simple heating. If the resin acts as a jelly on the hot plate initially, the cure time is considered zero.

All parts and percentages in the specification and claims are by weight unless otherwise specified.

What I claim and desire to protect by Letters Patent is:

1. A resinous reaction product prepared from a dihydric alcohol, an alpha-beta-unsaturated dicarboxylic acid, phthalic acid and a monohydric alcohol ester of an acid selected from the group consisting of rosin acids and partially hydrogenated rosin acids, the nonalcoholic reactants being employed in amounts defined by the area ABC of Figure 1, the dihydric alcohol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers, the ethylenic double bonds of the aforesaid partially hydrogenated rosin acids being not more than 70% hydrogenated, the said dihydric alcohol containing only hydroxyl groups as reactive substituents, and the said monohydric alcohol containing no reactive group other than hydroxyl.

2. A resinous reaction product prepared from an aliphatic glycol, an alpha-beta-unsaturated dicarboxylic acid, phthalic acid, and a monohydric alcohol ester of an acid selected from the group consisting of rosin acids and partially hydrogenated rosin acids, the nonalcoholic reactants being employed in amounts defined by the area ABC of Figure 1, the aliphatic glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers, the ethylenic double bonds of the aforesaid partially hydrogenated rosin acids being not more than 70 hydrogenated, the said dihydric alcohol containing only hydroxyl groups as reactive substituents, and the said monohydric alcohol containing no reactive group other than hydroxyl.

3. A resinous reaction product prepared from ethylene glycol, an alpha-beta-unsaturated dicarboxylic acid, phthalic acid and a monohydric alcohol ester of an acid from the group consisting of rosin acids and partially hydrogenated rosin acids, the nonalcoholic reactants being employed in amounts defined by the area ABC of Figure 1, the ethylene glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers, the ethylenic double bonds of the aforesaid partially hydrogenated rosin acids being not more than 70% hydrogenated, and said monohydric alcohol containing no reactive group other than hydroxyl.

4. A resinous reaction product prepared from diethylene glycol, an alpha-beta-unsaturated dicarboxylic acid, phthalic acid and a monohydric alcohol ester of an acid from the group consisting of rosin acids and partially hydrogenated rosin acids, the nonalcoholic reactants being employed in amounts defined by the area ABC of Figure 1, the diethylene glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers, the ethylenic double bonds of the aforesaid partially hydrogenated rosin acids being not more than 70% hydrogenated, and said monohydric alcohol containing no reactive group other than hydroxyl.

5. A resinous reaction product prepared from ethylene glycol, maleic acid, phthalic acid and a monohydric alcohol ester of an acid from the group consisting of rosin acids and partially hydrogenated rosin acids, the nonalcoholic reactants being employed in amounts defined by the area ABC of Figure 1, the ethylene glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers, the ethylenic double bonds of the aforesaid partially hydrogenated rosin acids being not more than 70% hydrogenated, and said monohydric alcohol containing no reactive group other than hydroxyl.

6. A resinous reaction product prepared from ethylene glycol, maleic acid, phthalic acid and the methyl ester of a rosin acid, the nonalcoholic reactants being employed in amounts defined by the area ABC of Figure 7, the ethylene glycol being employed in the amount of from 0.70 to 1.50 mols per mol of total dicarboxylic acids, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers.

7. A resinous reaction product prepared from diethylene glycol, fumaric acid, phthalic acid and the methyl ester of a rosin acid, the nonalcoholic reactants being employed in amounts defined by the area ABC of Figure 1, the diethylene glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers.

8. A resinous reaction product prepared from diethylene glycol, maleic acid, phthalic acid and the methyl ester of a rosin acid, the nonalcoholic reactants being employed in amounts defined by the area ABC of Figure 1, the diethylene glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers.

9. A resinous reaction product prepared from an aliphatic glycol, an alpha-beta-unsaturated dicarboxylic acid, phthalic acid, and the methyl ester of an acid selected from the group consisting of rosin acids and partially hydrogenated rosin acids, the nonalcoholic reactants being employed in amounts defined by the area ABC of Figure 1, the aliphatic glycol being employed in the amount of from 0.70 to 1.50 mols per mol of total dicarboxylic acid, said resinous reaction product being characterized by fusibility, by solubility in benzene and ethyl acetate, by a phenol red acid number less than 50, by substantial stability to heat at temperatures below 150° C., by the capacity to be cured to an infusible state by heat at above 200° C., by a cure time at 200° C. of less than 4 minutes and by the capacity to form permanently clear solutions with vinyl acetate-chloride copolymers, the ethylenic double bonds of the aforesaid partially hydrogenated rosin acids being not more than 70% hydrogenated, and the said aliphatic glycol containing only hydroxyl groups as reactive substituents.

CLARENCE D. ENDER.

REFERENCES CITED

The following references are of record in the file of this patent:

UNITED STATES PATENTS

| Number | Name | Date |
| --- | --- | --- |
| 2,025,947 | Humphey | Dec. 31, 1935 |
| 2,086,458 | Adams | July 6, 1937 |
| 2,181,054 | Hampton et al. | Nov. 21, 1939 |
| 2,411,904 | Spiller | Dec. 3, 1946 |